US012025996B2

(12) United States Patent
Huang (10) Patent No.: US 12,025,996 B2
(45) Date of Patent: Jul. 2, 2024

(54) UNMANNED AERIAL VEHICLE PATH PLANNING METHOD AND APPARATUS AND UNMANNED AERIAL VEHICLE (71) Applicant: AUTEL ROBOTICS CO., LTD., Guangdong (CN)

(72) Inventor: Jinxin Huang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 344 days.

(21) Appl. No.: 17/322,135

(22) Filed: May 17, 2021

(65) Prior Publication Data

US 2021/0271269 A1 Sep. 2, 2021

Related U.S. Application Data (63) Continuation of application No. PCT/CN2018/116701, filed on Nov. 21, 2018.

(51) Int. Cl.
*G05D 1/10* (2006.01)
*B64C 39/02* (2023.01)
(Continued)

(52) U.S. Cl.
CPC .......... *G05D 1/606* (2024.01); *B64C 39/024* (2013.01); *G05D 1/652* (2024.01); *G06T 7/50* (2017.01);
(Continued)

(58) Field of Classification Search
CPC ...... G05D 1/106; G05D 1/102; B64C 39/024; G06T 7/50; G06V 20/10; G08G 5/0021;
(Continued)

(56) References Cited

U.S. PATENT DOCUMENTS

2012/0036229 A1* 2/2012 Uyama ................ G01C 21/34 709/219
2016/0210865 A1* 7/2016 Mizutani ............... G01C 21/20
(Continued)

FOREIGN PATENT DOCUMENTS

CN 103809597 A 5/2014
CN 106092102 A 11/2016
(Continued)

OTHER PUBLICATIONS

Journal of Intelligent robot system, (2015) 78:127-142, Title: "Model-Based Local Path Planning for UAVs", by ("Hebecker") (Year: 2015).*

(Continued)

*Primary Examiner* — Sohana Tanju Khayer (57) ABSTRACT

Embodiments of the present application relate to the technical field of robot control, and in particular, to an unmanned aerial vehicle (UAV) path planning method and apparatus and a UAV. The UAV path planning method includes: acquiring a depth map of an environment in front of a UAV; acquiring a grid map centered on a body of the UAV according to the depth map; determining candidate flight directions for the UAV according to the grid map; determining an optimal flight direction for the UAV from the candidate flight directions; and controlling the UAV to fly in the optimal flight direction to avoid an obstacle in the environment in front of the UAV. In this way, the embodiments of the present application can accurately determine an obstacle that suddenly appears in an unknown environment and a dynamic environment, so as to achieve real-time path planning.

26 Claims, 5 Drawing Sheets (51) Int. Cl.
  *G05D 1/606* (2024.01)
  *G05D 1/652* (2024.01)
  *G06T 7/50* (2017.01)
  *G06V 20/10* (2022.01)
  *G08G 5/00* (2006.01)
  *G08G 5/04* (2006.01)
  *B64U 10/13* (2023.01)

(52) U.S. Cl.
  CPC ........... *G06V 20/10* (2022.01); *G08G 5/0021* (2013.01); *G08G 5/0039* (2013.01); *G08G 5/0069* (2013.01); *G08G 5/0086* (2013.01); *G08G 5/045* (2013.01); *B64U 10/13* (2023.01)

(58) Field of Classification Search
  CPC .. G08G 5/0039; G08G 5/0069; G08G 5/0086; G08G 5/045; G08G 5/0052; B64U 10/13; B64U 2201/00
  See application file for complete search history.

(56) References Cited

U.S. PATENT DOCUMENTS

| | | | |
|---|---|---|---|
| 2017/0116487 A1* | 4/2017 | Yamazaki | G06V 10/44 |
| 2017/0193830 A1* | 7/2017 | Fragoso | G08G 5/045 |
| 2018/0204469 A1* | 7/2018 | Moster | G01C 11/02 |
| 2018/0322646 A1* | 11/2018 | Matthies | G06V 20/10 |
| 2019/0051198 A1* | 2/2019 | Nimmagadda | G05D 1/0274 |
| 2019/0206073 A1* | 7/2019 | Huang | G08G 5/045 |
| 2020/0096355 A1* | 3/2020 | Mishina | G01C 21/3492 |

FOREIGN PATENT DOCUMENTS

| | | |
|---|---|---|
| CN | 106529495 A | 3/2017 |
| CN | 106681353 A | 5/2017 |
| CN | 108521807 A | 9/2018 |
| CN | 108827306 A | 11/2018 |
| WO | 2016033797 A1 | 3/2016 |
| WO | 2018142395 A1 | 8/2018 |

OTHER PUBLICATIONS

PCT International Search Report dated Aug. 30, 2019; PCT/CN2018/116701.

Extended European Search Report dated Oct. 25, 2021; Appln. No. 18940701.8.

Tanja Hebecker et al. :"Model-Based Local Path Planning for UAVs", Journal of Intelligent and Robotic Systems, 78: pp. 127-142; Published Online Aug. 30, 2014.

* cited by examiner

UNMANNED AERIAL VEHICLE PATH PLANNING METHOD AND APPARATUS AND UNMANNED AERIAL VEHICLE

CROSS REFERENCE

This application is a continuation of International Application No. PCT/CN2018/116701, filed on Nov. 21, 2018, which is incorporated herein by reference in its entirety.

BACKGROUND

Technical Field

Embodiments of the present application relate to the technical field of robot control, and in particular, to an unmanned aerial vehicle (UAV) path planning method and apparatus and a UAV.

Related Art

A UAV is a drone operated by a radio remote control device or its program control apparatus. With the development of technologies related to a UAV and complex changes of application scenarios of the UAV, requirements for an automatic sensing capability and a path planning algorithm of the UAV are increasingly high. In particular, in an autonomous flight technology of the UAV, the UAV is required to perceive its motion state and a surrounding environment and use a path planning algorithm to reach a target point safely without collision in an environment with obstacles, to avoid collisions and bombings.

Currently, a global path planning method is usually used for a UAV to obtain a desirable flight path to prevent the UAV from colliding with obstacles during flight. However, the global path planning method is merely applicable to a static environment and cannot accurately determine obstacles in an unknown environment and a dynamic environment. As a result, real-time performance cannot be guaranteed.

SUMMARY

Embodiments of the present application are intended to provide a UAV path planning method and apparatus and a UAV, which can accurately determine an obstacle that suddenly appears in an unknown environment and a dynamic environment, so as to achieve real-time path planning.

In order to resolve the technical problem, a technical solution adopted in the embodiments of the present application is as follows: A UAV path planning method is provided, including:
acquiring a depth map of an environment in front of a UAV;
acquiring a grid map centered on a body of the UAV according to the depth map;
determining candidate flight directions for the UAV according to the grid map;
determining an optimal flight direction for the UAV from the candidate flight directions; and
controlling the UAV to fly in the optimal flight direction to avoid an obstacle in the environment in front of the UAV.

Optionally, the acquiring a depth map of an environment in front of a UAV includes:
acquiring the depth map of the environment in front of the UAV through a depth sensor.

Optionally, the determining candidate flight directions for the UAV according to the grid map includes:
determining passable areas for the UAV according to the grid map, the passable areas being areas with no obstacle; and
determining the candidate flight directions for the UAV according to the passable areas.

Optionally, the determining passable areas for the UAV according to the grid map includes:
divide the grid map into a plurality of areas;
sampling coordinates of the obstacle; and
determining areas which the coordinates do not fall into as the passable areas.

Optionally, the dividing the grid map into a plurality of areas includes:
dividing the grid map at intervals of a preset angle by using a center of the grid map as a center to acquire the plurality of areas.

Optionally, the sampling coordinates of the obstacle includes:
sampling coordinates of a center point of a grid in the grid map occupied by the obstacle and/or coordinates of an angular point of the grid occupied by the obstacle.

Optionally, the method further includes:
re-dividing the grid map when the passable areas are not present.

Optionally, the determining an optimal flight direction for the UAV from the candidate flight directions includes:
calculating a cost function; and
determining the optimal flight direction for the UAV from the candidate flight directions according to the cost function.

Optionally, the cost function is:

$$f = k_1 \times g(\text{direc}_{goal}, \text{direc}_{cur}) + k_2 \times g(\text{direc}_{pre}, \text{direc}_{cur}) - k_3 \times \text{sum}$$

$g(\text{direc}_{goal}, \text{direc}_{cur})$ representing consistency of one of the candidate flight directions with a target flight direction for the UAV, $g(\text{direc}_{pre}, \text{direc}_{cur})$ representing consistency of the candidate flight direction with a previously determined optimal flight direction, sum representing a number of passable areas and $k_1$, $k_2$ and $k_3$ being weight coefficients.

Optionally, the determining the optimal flight direction for the UAV from the candidate flight directions according to the cost function includes:
determining the candidate flight direction corresponding to a minimum cost function value as the optimal flight direction for the UAV.

Optionally, the method further includes:
determining whether a distance of flight of the UAV in the optimal flight direction reaches a preset distance; and
if so, re-determining the optimal flight direction.

Optionally, the method further includes:
controlling the UAV to continue flying in the optimal flight direction if the distance of flight of the UAV in the optimal flight direction does not reach the preset distance.

Optionally, before the acquiring a grid map centered on a body of the UAV according to the depth map, the method further includes:
determining whether the UAV has an angle of pitch; and
performing depth compensation on the depth map if the UAV has the angle of pitch.

Optionally, the performing depth compensation on the depth map if the UAV has the angle of pitch includes:

calculating a number of pixel rows for the depth compensation, the number of pixel rows for the depth compensation being row_see=tan θ×f, θ being the angle of pitch of the UAV and f being a focal length of a camera of the UAV; and determining a row index of an image plane of the UAV on the depth map according to the number of pixel rows for the depth compensation, the row index row_horizon of the image plane of the UAV on the depth map being row_horizon=row_half+row_see, row_half being half of a number of rows of the depth map.

In order to resolve the technical problem, another technical solution adopted in the embodiments of the present application is as follows: A UAV path planning apparatus is provided, the apparatus including:

an acquiring module configured to acquire a depth map of an environment in front of a UAV; and acquire a grid map centered on a body of the UAV according to the depth map;

a determining module configured to determine candidate flight directions for the UAV according to the grid map; and determine an optimal flight direction for the UAV from the candidate flight directions; and a control module configured to control the UAV to fly in the optimal flight direction to avoid an obstacle in the environment in front of the UAV.

Optionally, the acquiring module is configured to acquire the depth map of the environment in front of the UAV through a depth sensor.

Optionally, the determining module is further configured to:

determine passable areas for the UAV according to the grid map, the passable areas being areas with no obstacle; and determine the candidate flight directions for the UAV according to the passable areas.

Optionally, the determining module is further configured to:

divide the grid map into a plurality of areas;

sample coordinates of the obstacle; and determine areas which the coordinates do not fall into as the passable areas.

Optionally, the determining module is further configured to:

divide the grid map at intervals of a preset angle by using a center of the grid map as a center to acquire the plurality of areas.

Optionally, the determining module is further configured to:

sample coordinates of a center point of a grid in the grid map occupied by the obstacle and/or coordinates of an angular point of the grid occupied by the obstacle.

Optionally, the determining module is further configured to:

re-divide the grid map when the passable areas are not present.

Optionally, the determining module is further configured to:

calculate a cost function; and determine the optimal flight direction for the UAV from the candidate flight directions according to the cost function.

Optionally, the cost function is:

$$f = k_1 \times g(direc_{goal}, direc_{cur}) + k_2 \times g(direc_{pre}, direc_{cur}) - k_3 \times sum$$

$g(direc_{goal}, direc_{cur})$ representing consistency of one of the candidate flight directions with a target flight direction for the UAV, $g(direc_{pre}, direc_{cur})$ representing consistency of the candidate flight direction with a previously determined optimal flight direction, sum representing a number of passable areas and $k_1$, $k_2$ and $k_3$ being weight coefficients.

Optionally, the determining module is further configured to:

determine the candidate flight direction corresponding to a minimum cost function value as the optimal flight direction for the UAV.

Optionally, the apparatus further includes:

a judging module configured to determine whether a distance of flight of the UAV in the optimal flight direction reaches a preset distance; where if so, the determining module re-determines the optimal flight direction.

Optionally, the control module is further configured to:

control the UAV to continue flying in the optimal flight direction if the distance of flight of the UAV in the optimal flight direction does not reach the preset distance.

Optionally, the judging module is further configured to:

determine whether the UAV has an angle of pitch; and

The apparatus further includes a depth compensation module configured to perform depth compensation on the depth map if the UAV has the angle of pitch.

Optionally, the depth compensation module is further configured to:

calculate a number of pixel rows for the depth compensation, the number of pixel rows for the depth compensation being row_see=tan θ×f, θ being the angle of pitch of the UAV and f being a focal length of a camera of the UAV; and determine a row index of an image plane of the UAV on the depth map according to the number of pixel rows for the depth compensation, the row index row_horizon of the image plane of the UAV on the depth map being row_horizon=row_half+row_see, row_half being half of a number of rows of the depth map.

In order to resolve the technical problem, another technical solution adopted in the embodiments of the present application is as follows: A UAV is provided, including:

a body;

arms connected to the body;

power apparatuses disposed on the arms;

at least one processor disposed in the body; and a memory communicatively connected to the at least one processor, the memory storing instructions executable by the at least one processor, the instructions, when executed by the at least one processor, causing the at least one processor to perform the above UAV path planning method.

In order to resolve the technical problem, another technical solution adopted in the embodiments of the present application is as follows: A nonvolatile computer-readable storage medium storing computer executable instructions used for causing a UAV to perform the above UAV path planning method.

The advantageous effects of the present application are as follows: Different from the prior art, the embodiments of the present application provide a UAV path planning method and apparatus and a UAV. The UAV path planning method includes: acquiring a depth map of an environment in front of the UAV and acquiring a grid map centered on the UAV according to the depth map; determining candidate flight directions for the UAV according to the grid map and determining an optimal flight direction for the UAV from the candidate flight directions; and controlling the UAV to fly in the optimal flight direction so that the UAV can avoid an obstacle in the front environment. In the embodiments of the present application, during determining, through the depth map of the environment in front of the UAV, of the optimal flight direction in which the UAV can avoid the obstacle, since the depth map of the environment in front of the UAV can reflect an environment on a flight path of the UAV in real time as the UAV is flying, acquiring the depth map of the front environment allows the UAV to accurately determine an obstacle that suddenly appears in an unknown environment and a dynamic environment. In this case, the optimal flight direction is determined through the depth map of the environment in front of the UAV, so that the UAV can adjust a flight path in real time according to an actual flight status and achieve real-time path planning.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

In order to make objectives, technical solutions, and advantages of embodiments of the present application clearer, the technical solutions in the embodiments of the present application will be clearly and completely described in the following with reference to the accompanying drawings. It is obvious that the embodiments to be described are only a part rather than all of the embodiments of the present application. It should be understood that the specific embodiments described herein are merely used to explain the present application but are not intended to limit the present application. All other embodiments obtained by a person of ordinary skill in the art based on the embodiments of the present application without creative efforts shall fall within the protection scope of the present application.

It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", and similar expressions in this specification are merely used for an illustrative purpose.

In addition, the technical features provided in different embodiments of the present application to be described below may be combined with each other as long as no conflict occurs.

Embodiments of the present application provide a UAV path planning method and apparatus. The method and the apparatus are applicable to a UAV, so that the UAV can accurately determine an obstacle that suddenly appears ahead in an unknown environment and a dynamic environment during flight and can plan an optimal flight direction in real time according to an actual flight status and fly in the optimal flight direction to avoid the obstacle. The optimal flight direction is a direction with no obstacle.

The UAV in the present application may be any suitable type of high-altitude UAV or low-altitude UAV, including a fixed-wing UAV, a rotary-wing UAV, a para-wing UAV, a flapping-wing UAV, or the like.

The present application is described below through specific embodiments.

Figure 1:
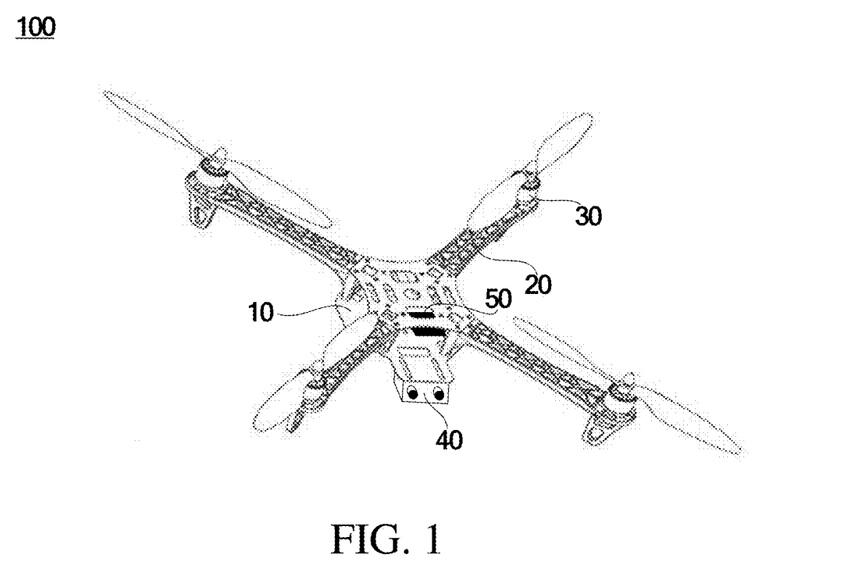
FIG. 1 is a schematic structural diagram of a UAV according to an embodiment of the present application.

FIG. 1 shows a UAV 100 according to an embodiment of the present application, including a body 10, arms 20, power apparatuses 30, a depth sensor 40 and a flight control system 50. The arms 20 and the depth sensor 40 are both connected to the body 10, the flight control system 50 is disposed in the body 10 and the power apparatuses 30 are disposed on the arms 20. The power apparatuses 30 and the depth sensor 40 are both communicatively connected to the flight control system 50, so that the flight control system 50 may control a flight posture of the UAV 100 through the power apparatuses 30 and obtain a front environment in a flight path of the UAV 100 through the depth sensor 40.

Preferably, there are four arms 20, which are evenly distributed around the body 10 to carry the power apparatuses 30. The arm 20 may be fixedly connected to or integrally formed with the body 10 or foldable or unfoldable relative to the body 10.

The power apparatuses 30 are disposed at one ends of the arms 20 away from the body which include motors disposed on the arms 20 and propellers connected to shafts of the motors. The motors each can drive each of the propellers to rotate to provide an elevating force for the UAV 100 to achieve flight. The motors each can further change a flight direction of the UAV 100 by changing a rotational speed and a rotational direction of each of the propellers. When the power apparatuses 30 are communicatively connected to the flight control system 50, the flight control system 50 may control the flight posture of the UAV 100 by controlling the motors.

Preferably, the four arms of the UAV 100 each have a power apparatus to allow the UAV 100 to fly smoothly.

The depth sensor 40 is configured to collect a depth map of an environment in front of the UAV 100. The depth map is an image or an image channel including information related to a distance to a surface of a scene object at a viewpoint. In the depth map, each pixel value represents an actual distance from the depth sensor to the object. Therefore, that the depth sensor 40 collects the depth map means to collect the actual distance between the depth sensor and the object in the front environment. When the depth sensor 40 is communicatively connected to the flight control system 50, the flight control system 50 may acquire the depth map of the environment in front of the UAV 100 from the depth sensor 40, that is, acquire the actual distance between the depth sensor 40 and the object in the front environment to obtain the front environment in the flight path of the UAV 100.

The depth sensor 40 includes but is not limited to a binocular camera, a time of flight (TOF) camera, a structured light camera a lidar and the like.

The flight control system 50 is communicatively connected to the power apparatuses 30 and the depth sensor 40 through a wired connection or a wireless connection. The wireless connection includes but is not limited to WiFi, Bluetooth, ZigBee and the like.

The flight control system 50 is configured to perform the UAV path planning method, so that the UAV 100 can accurately determine an obstacle that suddenly appears ahead in an unknown environment and a dynamic environment and can plan an optimal flight direction in real time according to an actual flight status and fly in the optimal flight direction to avoid the obstacle.

Specifically, during flight preparation and flight of the UAV 100, the flight control system 50 acquires the depth map of the environment in front of the UAV 100 through the depth sensor 40, and the flight control system 50 acquires a grid map centered on the body of the UAV 100 according to the depth map after acquiring the depth map of the environment in front of the UAV 100.

The grid map is formed by mapping depth information in the depth map to a plane grid map centered on the body. Each grid is given a possible value representing a probability that the grid is occupied by an obstacle. When an obstacle is present in the depth map of the environment, the obstacle occupies a grid in the grid map, and a position of the obstacle may be learned through coordinates of the occupied grid.

Grids in the grid map are arranged in a matrix. Preferably, in this embodiment of the present application, the grid map is a 10*10 matrix.

In another embodiment of the present application, if the UAV 100 generates an angle of pitch during flight, a front view of the UAV 100 is no longer horizontal. In this case, the depth map collected by the depth sensor 40 is no longer a depth map of a horizontal front of the UAV 100, which causes errors in depth information reflected by the depth map, resulting in inaccuracy of the grid map. Therefore, before acquiring a grid map centered about the body of the UAV 100 according to the depth map, the flight control system 50 needs to determine whether the UAV 100 has an angle of pitch. If the angle of pitch is present, the flight control system 50 needs to perform depth compensation on the depth map and then acquires the grid map centered about the body of the UAV 100 according to the depth map after the depth compensation.

The flight control system 50 may measure a three-axis posture angle of the UAV 100 through an inertial measurement unit (IMU) to determine whether the UAV 100 has an angle of pitch according to the three-axis posture angle. The inertial measurement unit is integrated in the flight control system 50.

performing, by the flight control system 50, depth compensation on the depth map specifically includes: calculating, by the flight control system 50, a number of pixel rows for the depth compensation and determining a row index of an image plane of the UAV on the depth map according to the number of pixel rows for the depth compensation after calculating the number of pixel rows for the depth compensation.

Figure 2:
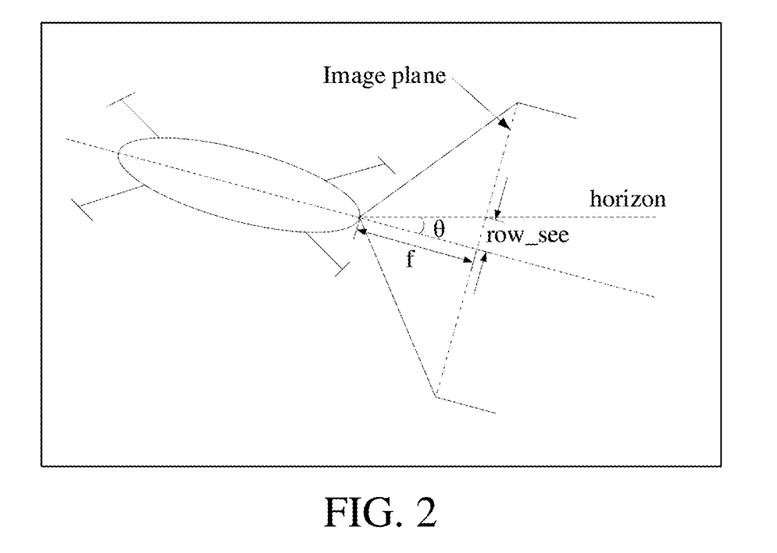
FIG. 2 is a schematic principle diagram of performing depth compensation on a depth map when a UAV has an angle of pitch in a UAV path planning method according to an embodiment of the present application.

Referring to FIG. 2, the number of pixel rows row_see for the depth compensation is row_see=tan θ×$f$, θ being the angle of pitch of the UAV 100 and $f$ being a focal length of a camera (the depth camera 40) of the UAV.

The row index row_horizon of the image plane of the UAV on the depth map is row_horizon=row_half+row_see, row_half being half of a number of rows of the depth map.

Further, the compensated depth information is mapped to the plane grid map centered on the body to acquire the grid map centered on the body of the UAV 100. Then the flight control system 50 further determines candidate flight directions for the UAV according to the grid map.

In some embodiments of the present application, determining, by the flight control system 50, the candidate flight directions for the UAV according to the grid map specifically includes: determining, by the flight control system 50, passable areas for the UAV 100 according to the grid map and determines the candidate flight directions for the UAV 100 according to the passable areas after determining the passable areas for the UAV 100.

The passable areas are areas in the grid map with no obstacle, and the candidate flight directions determined based on the passable areas are directions with no obstacle.

The flight control system 50 determines directions corresponding to all passable areas as candidate flight directions.

In some embodiments of the present application, determining, by the flight control system 50, the passable areas for the UAV 100 according to the grid map specifically includes: dividing, by the flight control system 50, the grid map into a plurality of areas and samples coordinates of the obstacle and determining, by the flight control system 50, whether the sampled coordinates of the obstacle fall into the areas divided from the grid map and determining areas which the coordinates do not fall into as the passable areas.

Dividing, by the flight control system 50, the grid map into a plurality of areas specifically includes: dividing, by the flight control system 50, the grid map at intervals of a preset angle by using a center of the grid map as a center to acquire the plurality of areas. In this case, each of the areas divided from the grid map is a fan-shaped area.

A larger preset angle indicates larger and fewer divided areas. A smaller preset angle indicates smaller and more divided areas.

Sampling, by the flight control system 50, the coordinates of the obstacle specifically includes: sampling, by the flight control system 50, coordinates of a center point of a grid occupied by the obstacle and/or coordinates of an angular point of the grid occupied by the obstacle in the grid map.

The flight control system 50 determines, as the passable areas, areas which the coordinates of the center point of the grid occupied by the obstacle and/or the coordinates of the angular point of the grid occupied by the obstacle do not fall into. Based on this, if the areas divided from the grid map are too small, the areas are likely to be covered by obstacles but none of sampled coordinates fall into the areas. In this case, an impassable area is falsely determined as a passable area. However, if the areas divided from the grid map are too large, few flight directions are present, impeding determination of an optimal flight direction. Therefore, in order to ensure reliability of path planning of the flight control system 50, the flight control system 50 adjusts the preset angle according to an actual flight effect.

The flight control system 50 adjusts the preset angle according to robustness of data of the depth map and accuracy of a planned direction.

In another embodiment of the present application, if the area division is inaccurate, it is possible that no passable area is present. Therefore, the flight control system 50 is further configured to perform the following method: the flight control system 50 re-divides the grid map when the passable areas are not present. The flight control system 50 divides the grid map at intervals of an adjusted preset angle by using the center of the grid map as a center to acquire a plurality of areas to determine the passable areas.

Further, the flight control system 50 determines the optimal flight direction for the UAV 100 from the candidate flight directions after determining the candidate flight directions for the UAV.

In some embodiments of the present application, determining, by the flight control system 50, the optimal flight direction for the UAV 100 from the candidate flight directions specifically includes: calculating, by the flight control system 50, a cost function and determining the optimal flight direction for the UAV from the candidate flight directions according to the cost function.

Calculating, by the flight control system 50, the cost function specifically includes: calculating, by the flight control system 50, a flight cost for each of the determined candidate flight directions through the cost function.

Determining, by the flight control system 50, the optimal flight direction for the UAV 100 from the candidate flight directions according to the cost function specifically includes: determining the candidate flight direction corresponding to a minimum cost function value as the optimal flight direction for the UAV 100.

The minimum cost function value is a minimum flight cost calculated through the cost function, that is, the candidate flight direction with the smallest flight cost is determined as the optimal flight direction for the UAV 100.

In some embodiments of the present application, the cost function is $$f = k_1 \times g(direc_{goal}, direc_{cur}) + k_2 \times g(direc_{pre}, direc_{cur}) - k_3 \times sum$$

$g(direc_{goal}, direc_{cur})$ representing consistency of one of the candidate flight directions with a target flight direction for the UAV 100, $g(direc_{pre}, direc_{cur})$ representing consistency of the candidate flight direction with a previously determined optimal flight direction, sum representing a number of passable areas and $k_1$, $k_2$ and $k_3$ being weight coefficients.

A candidate flight direction having higher consistency with the target flight direction for the UAV 100, higher consistency with the previously determined optimal flight direction and more passable areas has a lower cost.

A priority sequence of $k_1$, $k_2$ and $k_3$ depends on values of the three factors. In order to cause the determined candidate flight direction to be consistent with the target flight direction as much as possible, $k_1 > k_2$, $k_3$ is required. In order to cause the determined candidate flight direction to be consistent with the previously determined optimal flight direction as much as possible, $k_2 > k_1$, $k_3$ is required. In order to ensure that the determined candidate flight direction is sufficiently safe, $k_3 > k_2$, $k_1$ is required.

Further, the target flight direction may be determined by using a preset target position, or may be determined according to a position of a tracked target.

Further, after determining the optimal flight direction for the UAV 100, the flight control system 50 controls the UAV 100 to fly in the optimal flight direction to avoid the obstacle in the environment in front of the UAV 100.

Specifically, the flight control system 50 changes the flight direction of the UAV 100 by controlling the motors to change the rotational speeds of the propellers and the rotational directions (counterclockwise or clockwise directions) of the propellers, so that the UAV 100 flies in the determined optimal flight direction.

In another embodiment of the present application, if the optimal flight direction is changed too frequently during the real-time planning, it is likely to cause difficulty in control. In order to reduce the control difficulty, the flight control system 50 may further perform the following method after the flight control system 50 controls the UAV 100 to fly in the optimal flight direction: The flight control system 50 determines whether a distance of flight of the UAV 100 in the optimal flight direction reaches a preset distance. The flight control system re-determines the optimal flight direction if the distance of flight of the UAV 100 in the optimal flight direction reaches the preset distance. The flight control system controls the UAV 100 to continue flying in the optimal flight direction if the distance of flight of the UAV 100 in the optimal flight direction does not reach the preset distance.

The preset distance is a distance between an obstacle and the UAV 100 when the obstacle appears in the previously determined optimal flight direction.

When the distance of flight of the UAV 100 in the optimal flight direction controlled by the flight control system 50 reaches the distance between the obstacle in the previously determined optimal flight direction and the UAV 100, it means that the UAV 100 has bypassed the obstacle in the previously determined optimal flight direction. In this case, re-determining the optimal flight direction may cause the UAV 100 to approach the previously determined optimal flight direction (the previously determined optimal flight direction is better than a currently determined optimal flight direction).

When the distance of flight of the UAV 100 in the optimal flight direction controlled by the flight control system 50 does not reach the distance between the obstacle in the previously determined optimal flight direction and the UAV 100, it means that the UAV 100 has not bypassed the obstacle in the previously determined optimal flight direction. In this case, the UAV continues flying in the optimal flight direction and keeps the determined direction unchanged to prevent the UAV 100 from frequently changing the flight direction.

In this embodiment of the present application, the optimal flight direction is determined by acquiring the depth map of the environment in front of the UAV, so that the UAV can accurately determine an obstacle that suddenly appears ahead in an unknown environment and a dynamic environment during the flight and can adjust a flight path in real time according to an actual flight status to achieve real-time path planning.

Figure 3:
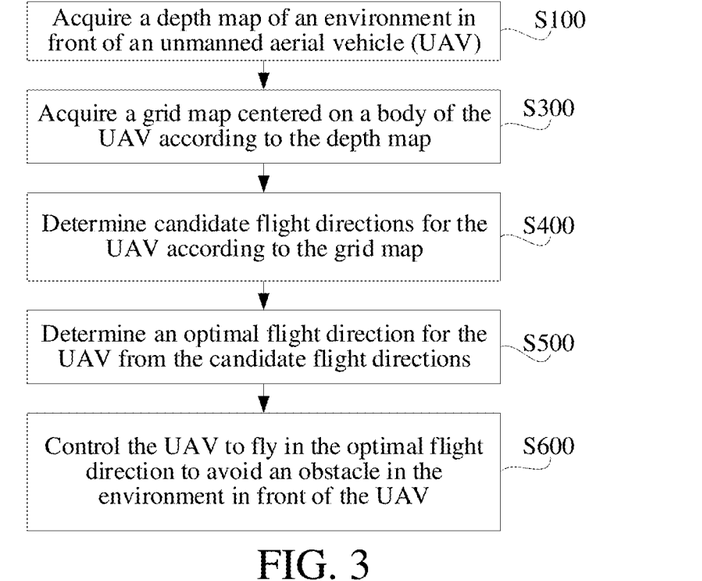
FIG. 3 is a schematic flowchart of a UAV path planning method according to an embodiment of the present application.

FIG. 3 is a schematic flowchart of a UAV path planning method according to an embodiment of the present application, which is applicable to a UAV. The UAV is the UAV 100 described in the above embodiment, and the method provided in this embodiment of the present application is performed by the above flight control system 50 for real-time path planning. The UAV path planning method includes the following steps:

S100: Acquire a depth map of an environment in front of the UAV.

In an embodiment of the present application, the depth map of the environment in front of the UAV may be acquired through a depth sensor.

The depth sensor includes but is not limited to a binocular camera, a time of flight (TOF) camera, a structured light camera and a lidar.

The depth map is an image or an image channel including information related to a distance to a surface of a scene object at a viewpoint. In the depth map, each pixel value represents an actual distance from the depth sensor to the object. Therefore, acquiring the depth map of the environment in front of the UAV through the depth sensor means to acquire the actual distance between the depth sensor and the object in the front environment.

S300: Acquire a grid map centered on a body of the UAV according to the depth map.

The grid map is formed by dividing the depth map into a series of grids. Each of the grids is given a possible value representing a probability that the grid is occupied. When an obstacle is present in the depth map of the environment, the obstacle occupies a grid in the grid map, and a position of the obstacle may be learned through coordinates of the occupied grid.

Grids in the grid map are arranged in a matrix. Preferably, in this embodiment of the present application, the grid map is a 10*10 matrix.

S400: Determine candidate flight directions for the UAV according to the grid map.

Figure 4:
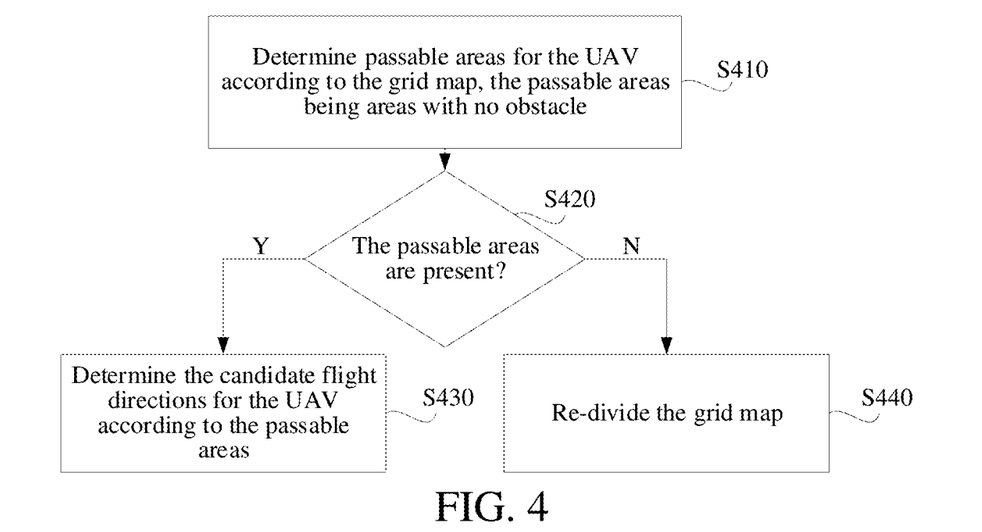
FIG. 4 is a schematic flowchart of step S400 in the method shown in FIG. 3.

Referring to FIG. 4, in some embodiments of the present application, determining the candidate flight directions for the UAV according to the grid map specifically includes the following step:

S410: Determine passable areas for the UAV according to the grid map, the passable areas being areas with no obstacle.

Figure 5:
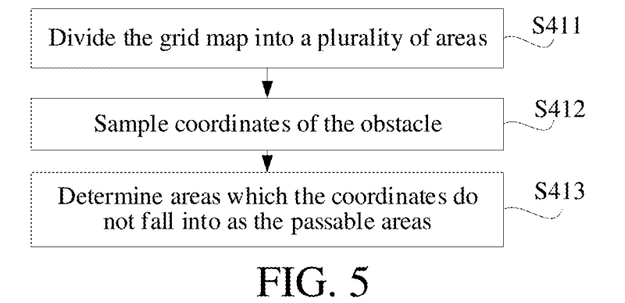
FIG. 5 is a schematic flowchart of step S410 in a method shown in FIG. 4.

Referring to FIG. 5, in some embodiments of the present application, determining the passable areas for the UAV according to the grid map specifically includes the following steps:

S411: Divide the grid map into a plurality of areas.

Dividing the grid map into the plurality of areas specifically includes:

dividing the grid map at intervals of a preset angle by using a center of the grid map as a center to acquire the plurality of areas.

Each of the areas divided from the grid map is a fan-shaped area.

A larger preset angle indicates larger and fewer divided areas. A smaller preset angle indicates smaller and more divided areas.

S412: Sample coordinates of the obstacle.

Sampling the coordinates of the obstacle specifically includes:

sampling coordinates of a center point of a grid in the grid map occupied by the obstacle and/or coordinates of an angular point of the grid occupied by the obstacle.

S413: Determine areas which the coordinates do not fall into as the passable areas.

Areas which the coordinates of the center point of the grid occupied by the obstacle and/or the coordinates of the angular point of the grid occupied by the obstacle do not fall into are determined as the passable areas. Based on this, if the areas divided from the grid map are too small, the areas are likely to be covered by obstacles but none of sampled coordinates fall into the areas. In this case, an impassable area is falsely determined as a passable area. However, if the areas divided from the grid map are too large, few flight directions are present, impeding determination of an optimal flight direction. Therefore, in order to ensure reliability of path planning, the preset angle is adjusted according to an actual flight effect.

The preset angle is adjusted according to robustness of data of the depth map and accuracy of a planned direction.

S420: Determine whether the passable areas are present and perform step S430 if the passable areas are present or perform step S440 if the passable areas are not present.

S430: Determine the candidate flight directions for the UAV according to the passable areas.

The candidate flight directions for the UAV are determined according to the passable areas only when the passable areas are present, that is, directions corresponding to all passable areas are determined as the candidate flight directions.

Since the passable areas are areas with no obstacle, the candidate flight directions determined based on the passable areas are directions with no obstacle.

S440: Re-divide the grid map.

The grid map needs to be re-divided when the passable areas are not present. Specifically, the grid map is divided at intervals of an adjusted preset angle by using the center of the grid map as a center to acquire a plurality of areas to determine the passable areas.

S500: Determine an optimal flight direction for the UAV from the candidate flight directions.

Figure 6:
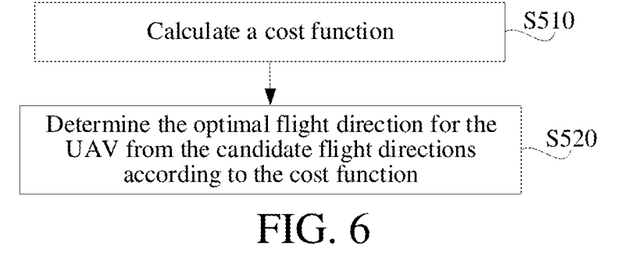
FIG. 6 is a schematic flowchart of step S500 in the method shown in FIG. 3.

Referring to FIG. 6, in some embodiments of the present application, determining the optimal flight direction for the UAV from the candidate flight directions specifically includes the following step:

S510: Calculate a cost function.

Calculating the cost function specifically includes: calculating a flight cost for each of the determined candidate flight directions through the cost function.

The cost function is:

$$f = k_1 \times g(\text{direc}_{goal}, \text{direc}_{cur}) + k_2 \times g(\text{direc}_{pre}, \text{direc}_{cur}) - k_3 \times \text{sum}$$

$g(\text{direc}_{goal}, \text{direc}_{cur})$ representing consistency of one of the candidate flight directions with a target flight direction for the UAV, $g(\text{direc}_{pre}, \text{direc}_{cur})$ representing consistency of the candidate flight direction with a previously determined optimal flight direction, sum representing a number of passable areas and $k_1$, $k_2$ and $k_3$ being weight coefficients.

A candidate flight direction having higher consistency with the target flight direction for the UAV, higher consistency with the previously determined optimal flight direction and more passable areas has a lower cost.

A priority sequence of $k_1$, $k_2$ and $k_3$ depends on values of the three factors. In order to cause the determined candidate flight direction to be consistent with the target flight direction as much as possible, $k_1 > k_2$, $k_3$ is required. In order to cause the determined candidate flight direction to be consistent with the previously determined optimal flight direction as much as possible, $k_2 > k_1$, $k_3$ is required. In order to ensure that the determined candidate flight direction is sufficiently safe, $k_3 > k_2$, $k_1$ is required.

The target flight direction may be determined by using a preset target position, or may be determined according to a position of a tracked target.

S520: Determine the optimal flight direction for the UAV from the candidate flight directions according to the cost function.

Determining the optimal flight direction for the UAV from the candidate flight directions according to the cost function specifically includes: determining the candidate flight direction corresponding to a minimum cost function value as the optimal flight direction for the UAV.

The minimum cost function value is a minimum flight cost calculated through the cost function, that is, the candidate flight direction with the smallest flight cost is determined as the optimal flight direction for the UAV.

S600: Control the UAV to fly in the optimal flight direction to avoid an obstacle in the environment in front of the UAV.

Specifically, the flight direction of the UAV is changed by controlling motors to change rotational speeds of propellers and rotational directions (counterclockwise or clockwise directions) of the propellers, so that the UAV flies in the determined optimal flight direction.

Figure 7:
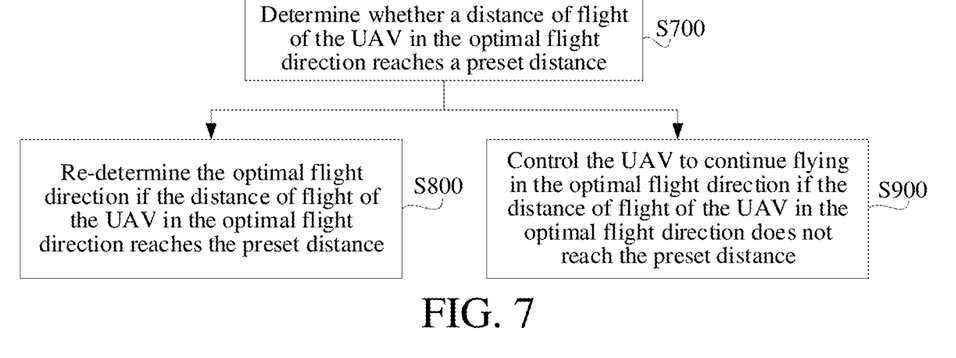
FIG. 7 is a partial schematic flowchart of a UAV path planning method according to another embodiment of the present application.

Referring to FIG. 7, in another embodiment of the present application, after step S600, the method further includes the following steps:

S700: Determine whether a distance of flight of the UAV in the optimal flight direction reaches a preset distance; and if so, perform step S800; or if not, perform step 900.

S800: Re-determine the optimal flight direction.

S900: Control the UAV to continue flying in the optimal flight direction.

The preset distance is a distance between an obstacle and the UAV when the obstacle appears in the previously determined optimal flight direction.

When the distance of flight of the UAV in the optimal flight direction reaches the distance between the obstacle in the previously determined optimal flight direction and the UAV, it means that the UAV has bypassed the obstacle in the previously determined optimal flight direction. In this case, re-determining the optimal flight direction may cause the UAV to approach the previously determined optimal flight direction (the previously determined optimal flight direction is better than a currently determined optimal flight direction).

When the distance of flight of the UAV in the optimal flight direction does not reach the distance between the obstacle in the previously determined optimal flight direction and the UAV, it means that the UAV has not bypassed the obstacle in the previously determined optimal flight direction. In this case, the UAV continues flying in the optimal flight direction and keeps the determined direction unchanged to prevent the UAV from frequently changing the flight direction and reduce control difficulty during the real-time planning.

Figure 8:
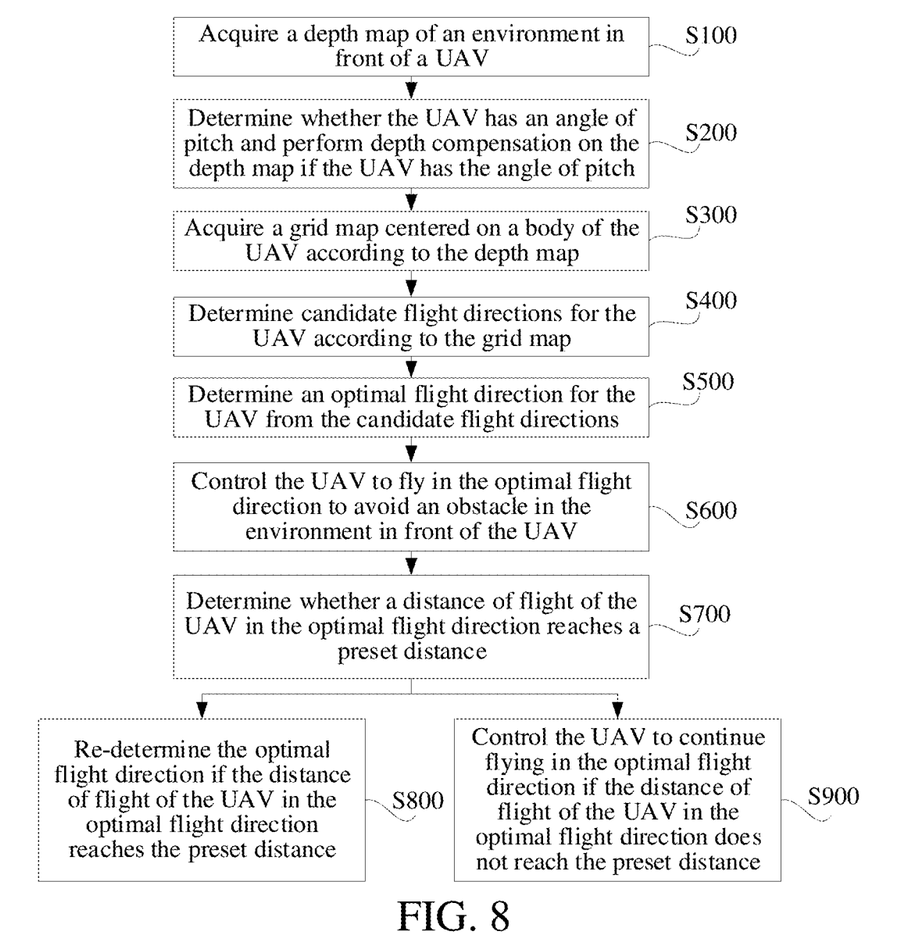
FIG. 8 is a schematic flowchart of a UAV path planning method according to still another embodiment of the present application.

Referring to FIG. 8, in another embodiment of the present application, before step S300, the method further includes the following step:

S200: Determine whether the UAV has an angle of pitch and perform depth compensation on the depth map if the UAV has the angle of pitch.

If the UAV generates an angle of pitch during flight, a front view of the UAV is no longer horizontal. In this case, the depth map collected by the depth sensor is no longer a depth map of a horizontal front of the UAV, which causes errors in depth information reflected by the depth map, resulting in inaccuracy of the grid map. Therefore, it is necessary to perform depth compensation on the depth map when the UAV has the angle of pitch and acquire a grid map centered about the body of the UAV according to the depth map after the depth compensation.

A three-axis posture angle of the UAV 100 may be measured through an inertial measurement unit (IMU) to determine whether the UAV has an angle of pitch according to the three-axis posture angle.

Figure 9:
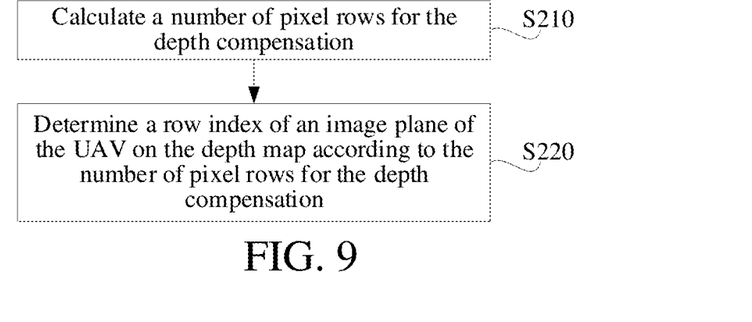
FIG. 9 is a schematic flowchart of step S200 in the method shown in FIG. 8.

Referring to FIG. 9, in an embodiment of the present application, performing depth compensation on the depth map if the UAV has the angle of pitch specifically includes the following steps:

S210: Calculate a number of pixel rows for the depth compensation, the number of pixel rows for the depth compensation being row_see=tan $\theta \times f$, $\theta$ being the angle of pitch of the UAV and $f$ being a focal length of a camera (the depth camera) of the UAV.

S220: Determine a row index of an image plane of the UAV on the depth map according to the number of pixel rows for the depth compensation, the row index row_horizon of the image plane of the UAV on the depth map being row_horizon=row_half+row_see, row_half being half of a number of rows of the depth map.

In this embodiment of the present application, the optimal flight direction is determined by acquiring the depth map of the environment in front of the UAV, so that the UAV can accurately determine an obstacle that suddenly appears ahead in an unknown environment and a dynamic environment during the flight and can adjust a flight path in real time according to an actual flight status to achieve real-time path planning.

The term "module" used herein may refer to a combination of software and/or hardware having a predetermined function. Although the apparatus described in the following embodiments may be implemented by using software, it is also conceivable that the apparatus may be implemented by using hardware, or a combination of software and hardware.

Figure 10:
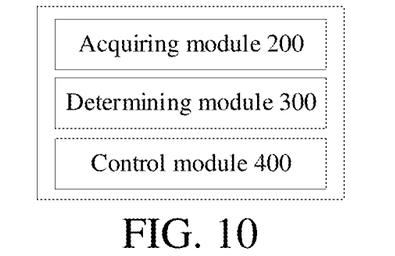
FIG. 10 is a schematic structural diagram of a UAV path planning apparatus according to an embodiment of the present application.

FIG. 10 shows a UAV path planning apparatus according to an embodiment of the present application, which is applicable to a UAV. The UAV is the UAV 100 described in the above embodiment, and functions of modules of the apparatus provided in this embodiment of the present application are performed by the above flight control system 50 for real-time path planning. The UAV path planning apparatus includes:

an acquiring module 200, where the acquiring module 200 is configured to acquire a depth map of an environment in front of the UAV; and
acquire a grid map centered on a body of the UAV according to the depth map;
a determining module 300, where the determining module 300 is configured to determine candidate flight directions for the UAV according to the grid map; and
determine an optimal flight direction for the UAV from the candidate flight directions; and
a control module 400, where the control module 400 is configured to control the UAV to fly in the optimal flight direction to avoid an obstacle in the environment in front of the UAV.

The acquiring module 200 is configured to acquire the depth map of the environment in front of the UAV through a depth sensor.

Further, the determining module 300 is further configured to:
determine passable areas for the UAV according to the grid map, the passable areas being areas with no obstacle; and
determine the candidate flight directions for the UAV according to the passable areas.

Further, the determining module 300 is further configured to:
divide the grid map into a plurality of areas;
sample coordinates of the obstacle; and
determine areas which the coordinates do not fall into as the passable areas.

Further, the determining module 300 is further configured to:
divide the grid map at intervals of a preset angle by using a center of the grid map as a center to acquire the plurality of areas.

Further, the determining module 300 is further configured to:
sample coordinates of a center point of a grid occupied by the obstacle and/or coordinates of an angular point of the grid occupied by the obstacle in the grid map.

Further, the determining module 300 is further configured to:
re-divide the grid map when the passable areas are not present.

Further, the determining module 300 is further configured to:
calculate a cost function; and
determine the optimal flight direction for the UAV from the candidate flight directions according to the cost function.

The cost function is:

$$f = k_1 \times g(direc_{goal}, direc_{cur}) + k_2 \times g(direc_{pre}, direc_{cur}) - k_3 \times sum$$

$g(direc_{goal}, direc_{cur})$ representing consistency of one of the candidate flight directions with a target flight direction for the UAV, $g(direc_{pre}, direc_{cur})$ representing consistency of the candidate flight direction with a previously determined optimal flight direction, sum representing a number of passable areas and $k_1$, $k_2$ and $k_3$ being weight coefficients.

Further, the determining module 300 is further configured to:
determine the candidate flight direction corresponding to a minimum cost function value as the optimal flight direction for the UAV.

Figure 11:
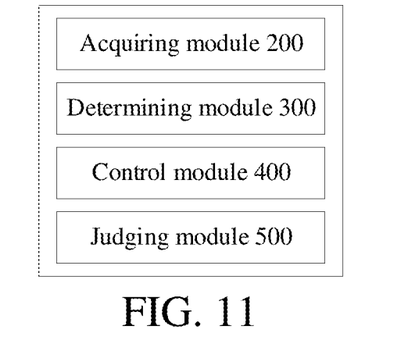
FIG. 11 is a schematic structural diagram of a UAV path planning apparatus according to another embodiment of the present application.

Further, referring to FIG. 11, the UAV path planning apparatus further includes:
a judging module 500, where the judging module 500 is configured to determine whether a distance of flight of the UAV in the optimal flight direction reaches a preset distance; where
if so, the determining module 300 re-determines the optimal flight direction.

Further, the control module 400 is further configured to:
control the UAV to continue flying in the optimal flight direction if the distance of flight of the UAV in the optimal flight direction does not reach the preset distance.

Figure 12:
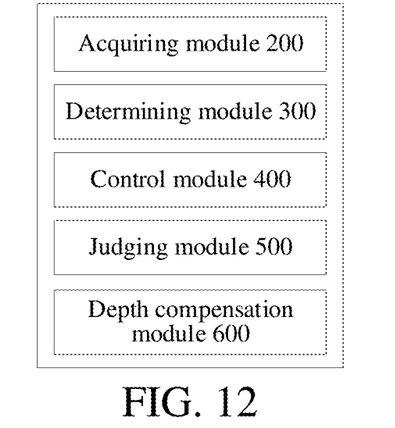
FIG. 12 is a schematic structural diagram of a UAV path planning apparatus according to still another embodiment of the present application.

Further, the judging module 500 is further configured to:
determine whether the UAV has an angle of pitch; and Referring to FIG. 12, the UAV path planning apparatus further includes: a depth compensation module 600, where the depth compensation module 600 is configured to perform depth compensation on the depth map if the UAV has the angle of pitch.

Further, the depth compensation module 600 is further configured to:
calculate a number of pixel rows for the depth compensation, the number of pixel rows for the depth compensation being
row_see=tan θ×f, θ being the angle of pitch of the UAV and f being a focal length of a camera of the UAV; and
determine a row index of an image plane of the UAV on the depth map according to the number of pixel rows for the depth compensation, the row index row_horizon of the image plane of the UAV on the depth map being
row_horizon=row_half+row_see, row_half being half of a number of rows of the depth map.

Certainly, in some other alternative embodiments, the acquiring module 200 may be a depth sensor to directly acquire the depth map of the environment in front of the UAV and the determining module 300, the control module 400, the judging module 500 and the depth compensation module 600 may be flight control chips.

The apparatus embodiment and the method embodiment are based on the same concept. Therefore, for the content of the apparatus embodiment, reference may be made to the method embodiment without mutual conflict among content, and details are not described herein again.

In this embodiment of the present application, the optimal flight direction is determined by acquiring the depth map of the environment in front of the UAV, so that the UAV can accurately determine an obstacle that suddenly appears ahead in an unknown environment and a dynamic environment during the flight and can adjust a flight path in real time according to an actual flight status to achieve real-time path planning.

Figure 13:
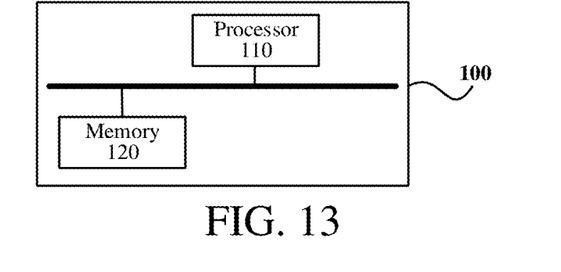
FIG. 13 is a schematic structural diagram of hardware of a UAV according to an embodiment of the present application.

FIG. 13 is a schematic structural diagram of hardware of a UAV according to an embodiment of the present application. The hardware modules provided in this embodiment of the present application may be integrated into the flight control system 50 described in the above embodiment or may be directly used as the flight control system 50 and disposed in the body 10, so that the UAV 100 can perform the UAV path planning method described in the above embodiment and can further implement the functions of the various modules of the UAV path planning apparatus described in the above embodiment. The UAV 100 includes:
one or more processors 110 and a memory 120. In FIG. 13, one processor 110 is used as an example.

The processor 110 and the memory 120 may be connected through a bus or in other manners and are, for example, connected through a bus in FIG. 13.

As a non-volatile computer-readable storage medium, the memory 120 may be configured to store a non-volatile software program, a non-volatile computer executable program and a module, for example, program instructions corresponding to the UAV path planning method and the modules corresponding to the UAV path planning apparatus in the above embodiments of the present application (for example, the acquiring module 200, the determining module 300, the control module 400 and the like). The processor 110 executes various functional applications and data processing of the UAV path planning method by executing a non-volatile software program, an instruction and a module stored in the memory 120, that is, implements the UAV path planning method in the above method embodiment and the functions of the modules of the above apparatus embodiment.

The memory 120 may include a program storage area and a data storage area. The program storage area may store an operating system, an application program required by at least one function and the like. The data storage area may store data created according to use of the UAV path planning or the like.

The storage data area further stores preset data, including a preset angle and the like.

In addition, the memory 120 may include a high speed random access memory, and may also include a non-volatile memory, such as at least one magnetic disk storage device, a flash memory, or another non-volatile solid-state storage device. In some embodiments, the memory 120 optionally includes memories disposed remote to the processor 110, and these remote memories may be connected to the processor 110 through a network. Examples of the network include, but are not limited to, the Internet, an intranet, a local area network, a mobile communication network, and a combination thereof.

The program instruction and one or more modules are stored in the memory 120, and the program instruction and the one or more modules, when being executed by the one or more processors 110, perform steps of the UAV path planning method in any of the foregoing method embodiments, or implement functions of the modules of the UAV path planning apparatus in any of the foregoing apparatus embodiments.

The foregoing product may perform the method provided in the foregoing embodiments of the present application, and have the corresponding functional modules for performing the method and beneficial effects thereof. For technical details not described in detail in this embodiment, refer to the method provided in the foregoing embodiments of the present application.

The embodiments of the present application further provide a non-volatile computer-readable storage medium, storing computer-executable instructions. The computer-executable instructions, when being executed by one or more processors such as one processor 110 in FIG. 13, may cause a computer to perform steps of the UAV path planning method in any of the foregoing method embodiments, or implement functions of the modules of the UAV path planning apparatus in any of the foregoing apparatus embodiments.

The embodiments of the present application further provide a computer program product, including a computer program stored in a non-volatile computer-readable storage medium. The computer program includes program instructions, and the program instructions, when being executed by one or more processors such as one processor 110 in FIG. 13, may cause a computer to perform steps of the UAV path planning method in any of the foregoing method embodiments, or implement functions of the modules of the UAV path planning apparatus in any of the foregoing apparatus embodiments.

The described apparatus embodiment is merely an example. The modules described as separate parts may or may not be physically separate, and parts displayed as modules may or may not be physical units, may be located in one position, or may be distributed on a plurality of network units. Some or all of the modules may be selected according to actual needs to achieve the objectives of the solutions of the embodiments.

Through the description of the foregoing embodiments, a person skilled in the art may clearly understand that the embodiments may be implemented by software in combination with a universal hardware platform, and may certainly be implemented by hardware. A person of ordinary skill in the art may understand that all or some of the processes of the methods in the foregoing embodiments may be implemented by a computer program instructing relevant hardware. The program may be stored in a computer-readable storage medium. During execution of the program, processes of the foregoing method embodiments may be included. The foregoing storage medium may be a magnetic disk, an optical disc, a read-only memory (ROM), a random access memory (RAM) or the like.

The foregoing descriptions are merely embodiments of the present application but are not intended to limit the patent scope of the present application. Any equivalent modifications made to the structures or processes based on the content of the specification and the accompanying drawings of the present application for direct or indirect use in other relevant technical fields shall also be encompassed in the patent protection scope of the present application.

Finally, it should be noted that the foregoing embodiments are merely intended for describing the technical solutions of the present invention rather than limiting the present application. Under the ideas of the present application, the technical features in the foregoing embodiments or different embodiments may also be combined, the steps may be performed in any order, many other changes of different aspects of the present application also exist as described above, and these changes are not provided in detail for simplicity. Although the present application is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not make the essence of corresponding technical solutions depart from the scope of the technical solutions of the embodiments of the present application.

The invention claimed is:

1. An unmanned aerial vehicle (UAV) path planning method, comprising:
acquiring a depth map of an environment in front of a UAV;
acquiring a grid map centered on a body of the UAV according to the depth map;
determining candidate flight directions for the UAV according to the grid map;
determining an optimal flight direction for the UAV from the candidate flight directions; and
controlling the UAV to fly in the optimal flight direction to avoid an obstacle in the environment in front of the UAV;
wherein before the acquiring the grid map centered on a body of the UAV according to the depth map, the method further comprises:
determining whether the UAV has an angle of pitch; and
performing depth compensation on the depth map if the UAV has the angle of pitch;
wherein the performing depth compensation on the depth map if the UAV has the angle of pitch comprises:
calculating a number of pixel rows for the depth compensation, the number of pixel rows for the depth compensation being row_see=tan θ×f, θ being the angle of pitch of the UAV and f being a focal length of a camera of the UAV; and determining a row index of an image plane of the UAV on the depth map according to the number of pixel rows for the depth compensation, the row index row_horizon of the image plane of the UAV on the depth map being row_horizon=row_half+row_see, row_half being half of a number of rows of the depth map.

2. The UAV path planning method according to claim 1, wherein the acquiring a depth map of an environment in front of the UAV comprises:
    acquiring the depth map of the environment in front of the UAV through a depth sensor.

3. The UAV path planning method according to claim 1, wherein the determining candidate flight directions for the UAV according to the grid map comprises:
    determining passable areas for the UAV according to the grid map, the passable areas being areas with no obstacle; and
    determining the candidate flight directions for the UAV according to the passable areas.

4. The UAV path planning method according to claim 3, wherein the determining passable areas for the UAV according to the grid map comprises:
    dividing the grid map into a plurality of areas;
    sampling coordinates of the obstacle; and
    determining areas which the coordinates do not fall into as the passable areas.

5. The UAV path planning method according to claim 4, wherein the dividing the grid map into the plurality of areas comprises:
    dividing the grid map at intervals of a preset angle by using a center of the grid map as a center to acquire the plurality of areas.

6. The UAV path planning method according to claim 4, wherein the sampling coordinates of the obstacle comprises:
    sampling coordinates of a center point of a grid in the grid map occupied by the obstacle and/or coordinates of an angular point of the grid occupied by the obstacle.

7. The UAV path planning method according to claim 4, further comprising: re-dividing the grid map when the passable areas are not present.

8. The UAV path planning method according to claim 1, wherein the determining the optimal flight direction for the UAV from the candidate flight directions comprises:
    calculating a cost function; and
    determining the optimal flight direction for the UAV from the candidate flight directions according to the cost function.

9. The UAV path planning method according to claim 8, wherein the cost function is:

$$f = k_1 \times g(direc_{goal}, direc_{cur}) + k_2 \times g(direc_{pre}, direc_{cur}) - k_3 \times sum$$

$g(direc_{goal}, direc_{cur})$ representing consistency of one of the candidate flight directions with a target flight direction for the UAV, $g(direc_{pre}, direc_{cur})$ representing consistency of the candidate flight direction with a previously determined optimal flight direction, sum representing a number of passable areas and $k_1$, $k_2$ and $k_3$ being weight coefficients.

10. The UAV path planning method according to claim 8, wherein the determining the optimal flight direction for the UAV from the candidate flight directions according to the cost function comprises:
    determining the candidate flight direction corresponding to a minimum cost function value as the optimal flight direction for the UAV.

11. The UAV path planning method according to claim 1, further comprising:
    determining whether a distance of flight of the UAV in the optimal flight direction reaches a preset distance; and
    if so, re-determining the optimal flight direction.

12. The UAV path planning method according to claim 11, further comprising:
    controlling the UAV to continue flying in the optimal flight direction if the distance of flight of the UAV in the optimal flight direction does not reach the preset distance.

13. An unmanned aerial vehicle (UAV) path planning apparatus, comprising:
    a memory storing computer executable instructions; and
    a processor configured to execute the instructions to:
    acquire a depth map of an environment in front of a UAV;
    acquire a grid map centered on a body of the UAV according to the depth map;
    determine candidate flight directions for the UAV according to the grid map;
    determine an optimal flight direction for the UAV from the candidate flight directions; and
    control the UAV to fly in the optimal flight direction to avoid an obstacle in the environment in front of the UAV;
    wherein the processor is further configured to:
    determine whether the UAV has an angle of pitch; and
    perform depth compensation on the depth map if the UAV has the angle of pitch;
    calculate a number of pixel rows for the depth compensation, the number of pixel rows for the depth compensation being
    row_see=tan θ×f, θ being the angle of pitch of the UAV and f being a focal length of a camera of the UAV; and
    determine a row index of an image plane of the UAV on the depth map according to the number of pixel rows for the depth compensation, the row index row_horizon of the image plane of the UAV on the depth map being row_horizon=row_half+row_see, row_half being half of a number of rows of the depth map.

14. The UAV path planning apparatus according to claim 13, wherein the processor is further configured to:
    acquire the depth map of the environment in front of the UAV through a depth sensor.

15. The UAV path planning apparatus according to claim 13, wherein the processor is further configured to:
    determine passable areas for the UAV according to the grid map, the passable areas being areas with no obstacle; and
    determine the candidate flight directions for the UAV according to the passable areas.

16. The UAV path planning apparatus according to claim 15, wherein the processor is further configured to:
    divide the grid map into a plurality of areas;
    sample coordinates of the obstacle; and
    determine areas which the coordinates do not fall into as the passable areas.

17. The UAV path planning apparatus according to claim 16, wherein the processor is further configured to:
    divide the grid map at intervals of a preset angle by using a center of the grid map as a center to acquire the plurality of areas.

18. The UAV path planning apparatus according to claim 16, wherein the processor is further configured to:
    sample coordinates of a center point of a grid in the grid map occupied by the obstacle and/or coordinates of an angular point of the grid occupied by the obstacle.

19. The UAV path planning apparatus according to claim 16, wherein the processor is further configured to: re-divide the grid map when the passable areas are not present.

20. The UAV path planning apparatus according to claim 13, wherein the processor is further configured to:
calculate a cost function; and
determine the optimal flight direction for the UAV from the candidate flight directions according to the cost function.

21. The UAV path planning apparatus according to claim 20, wherein the cost function is:

$$f = k_1 \times g(direc_{goal}, direc_{cur}) + k_2 \times g(direc_{pre}, direc_{cur}) - k_3 \times sum$$

$g(direc_{goal}, direc_{cur})$ representing consistency of one of the candidate flight directions with a target flight direction for the UAV, $g(direc_{pre}, direc_{cur})$ representing consistency of the candidate flight direction with a previously determined optimal flight direction, sum representing a number of passable areas and $k_1$, $k_2$ and $k_3$ being weight coefficients.

22. The UAV path planning apparatus according to claim 20, wherein the processor is further configured to:
determine the candidate flight direction corresponding to a minimum cost function value as the optimal flight direction for the UAV.

23. The UAV path planning apparatus according to claim 13, the processor is further configured to:
determine whether a distance of flight of the UAV in the optimal flight direction reaches a preset distance; and
if so, re-determine the optimal flight direction.

24. The UAV path planning apparatus according to claim 23, wherein the processor is further configured to:
control the UAV to continue flying in the optimal flight direction if the distance of flight of the UAV in the optimal flight direction does not reach the preset distance.

25. An unmanned aerial vehicle (UAV), comprising:
a body;
arms connected to the body;
power apparatuses disposed on the arms;
at least one processor disposed in the body; and
a memory communicatively connected to the at least one processor, the memory storing instructions executable by the at least one processor, the instructions, when executed by the at least one processor, causing the at least one processor to perform the following operations:
acquiring a depth map of an environment in front of the UAV;
acquiring a grid map centered on a body of the UAV according to the depth map;
determining candidate flight directions for the UAV according to the grid map;
determining an optimal flight direction for the UAV from the candidate flight directions; and
controlling the UAV to fly in the optimal flight direction to avoid an obstacle in the environment in front of the UAV;
wherein the processor is further configured to:
determine whether the UAV has an angle of pitch; and
perform depth compensation on the depth map if the UAV has the angle of pitch;
calculate a number of pixel rows for the depth compensation, the number of pixel rows for the depth compensation being
row_see=$\tan \theta \times f$, $\theta$ being the angle of pitch of the UAV and $f$ being a focal length of a camera of the UAV; and
determine a row index of an image plane of the UAV on the depth map according to the number of pixel rows for the depth compensation, the row index row_horizon of the image plane of the UAV on the depth map being
row_horizon=row_half+row_see, row_half being half of a number of rows of the depth map.

26. A nonvolatile computer-readable storage medium, storing computer-executable instructions used for causing an unmanned aerial vehicle (UAV) to perform following operations:
acquiring a depth map of an environment in front of the UAV;
acquiring a grid map centered on a body of the UAV according to the depth map;
determining candidate flight directions for the UAV according to the grid map;
determining an optimal flight direction for the UAV from the candidate flight directions; and
controlling the UAV to fly in the optimal flight direction to avoid an obstacle in the environment in front of the UAV;
wherein the processor is further configured to:
determine whether the UAV has an angle of pitch; and
perform depth compensation on the depth map if the UAV has the angle of pitch;
calculate a number of pixel rows for the depth compensation, the number of pixel rows for the depth compensation being
row_see=$\tan \theta \times f$, $\theta$ being the angle of pitch of the UAV and $f$ being a focal length of a camera of the UAV; and
determine a row index of an image plane of the UAV on the depth map according to the number of pixel rows for the depth compensation, the row index row_horizon of the image plane of the UAV on the depth map being
row_horizon=row_half+row_see, row_half being half of a number of rows of the depth map.

* * * * *